(12) United States Patent
Minnicucci et al.

(10) Patent No.: US 9,687,877 B2
(45) Date of Patent: Jun. 27, 2017

(54) SELECTION MACHINE FOR SEPARATING FRUITS FROM FOREIGN BODIES ATTACHED TO THE FRUITS

(71) Applicant: C.M.A. S.N.C. DI MINNICUCCI TOMMASO GIUSEPPE & C., Mogliano (MC) (IT)

(72) Inventors: Andrea Minnicucci, Recanati (IT); Giuseppe Minnicucci, Mogliano (IT); Roberto Ripani, Pollenza (IT)

(73) Assignee: C.M.A.S.N.C. DI MINNICUCCI TOMMASO GIUSEPPE & C., Mogliano (MC) (IT)

( * ) Notice: Subject to any disclaimer, the term of this patent is extended or adjusted under 35 U.S.C. 154(b) by 0 days.

(21) Appl. No.: 15/230,741

(22) Filed: Aug. 8, 2016

(65) Prior Publication Data
US 2017/0050218 A1  Feb. 23, 2017

(30) Foreign Application Priority Data
Aug. 20, 2015  (IT) .......................... 102015000045655

(51) Int. Cl.
*B07B 1/34*  (2006.01)
*B07B 1/28*  (2006.01)

(52) U.S. Cl.
CPC .................................. *B07B 1/282* (2013.01)

(58) Field of Classification Search
CPC .............. B07B 1/28; B07B 1/282; B07B 1/38
USPC ......................... 209/309, 326, 659, 660, 682
See application file for complete search history.

(56) References Cited

U.S. PATENT DOCUMENTS

| | | | | |
|---|---|---|---|---|
| 1,924,111 A * | 8/1933 | Erickson | ................. | A23N 15/02 426/484 |
| 2,058,833 A * | 10/1936 | Kuhlengel | .............. | B07B 1/284 209/326 |
| 2,386,579 A * | 10/1945 | Wheeler | ................. | B07B 1/286 209/314 |
| 3,235,078 A * | 2/1966 | Hostetler | ................ | B07B 1/005 209/315 |
| 4,981,220 A * | 1/1991 | Kolodesh | ................ | A23N 1/003 209/691 |
| 6,679,386 B2 * | 1/2004 | Tsutsumi | .................. | B07B 1/46 209/331 |
| 7,581,646 B2 * | 9/2009 | Barr | .......................... | B07B 1/12 209/235 |

* cited by examiner

*Primary Examiner* — Terrell Matthews

(57) ABSTRACT

A selection machine for separating fruits from foreign bodies has a rigid support frame, a mobile frame connected to the fixed frame and having a longitudinal axis (A-A), a connection between the fixed frame and the mobile frame, actuation means of the mobile frame; the mobile frame has a rectangular section and upper wall and a lower wall with a plurality of holes; the mobile frame oscillating around a horizontal rotation axis (X-X) disposed transversally to the longitudinal axis (A-A); the connection being a horizontal connecting pivoting pin having a longitudinal axis that coincides with the horizontal rotation axis (X-X) of the mobile frame.

9 Claims, 2 Drawing Sheets

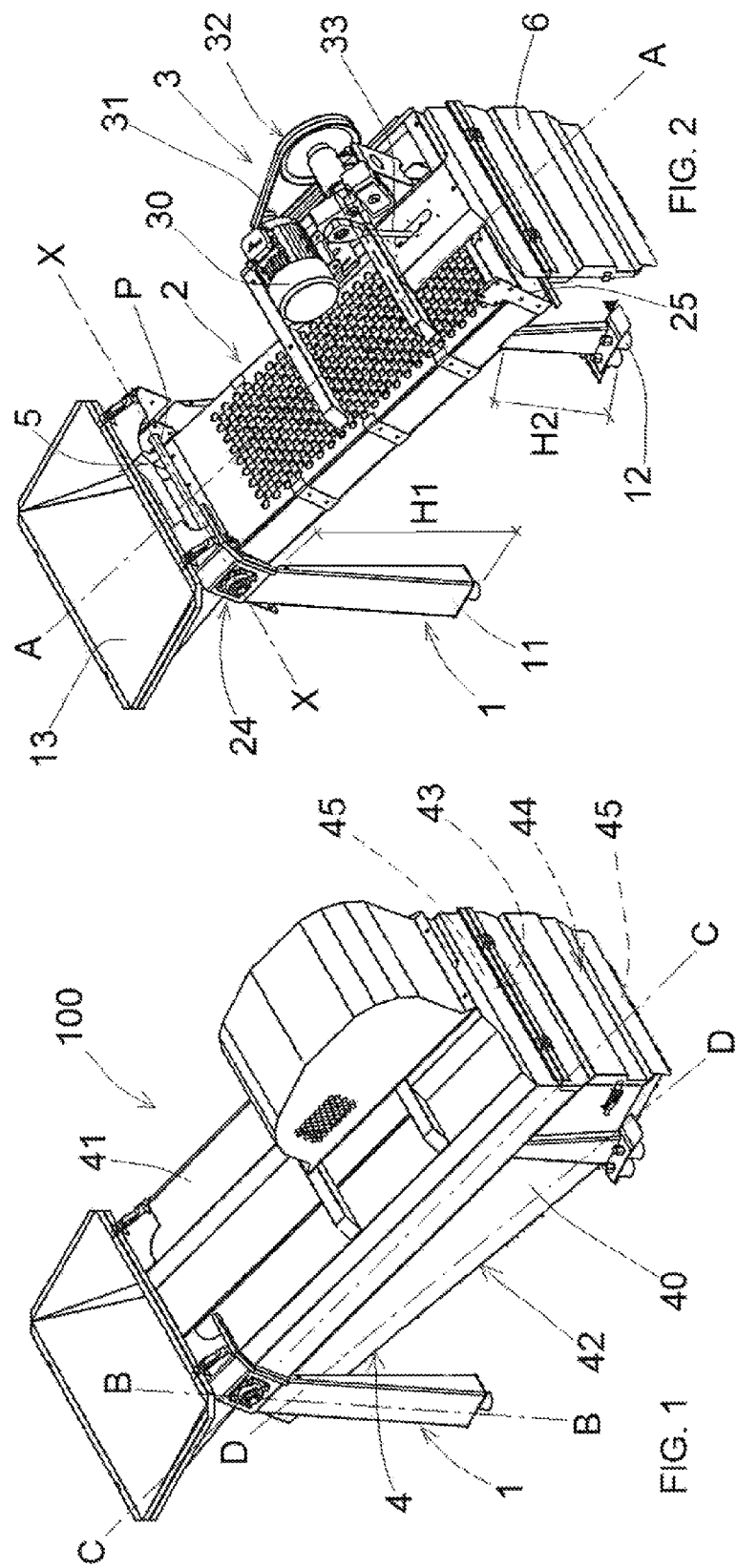

SELECTION MACHINE FOR SEPARATING FRUITS FROM FOREIGN BODIES ATTACHED TO THE FRUITS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a selection machine for separating fruits from foreign bodies attached to the fruits.

2. Description of Related Art Including Information Disclosed Under 37 CFR 1.97 and 37 CFR 1.98.

It is known that fruits, such as grapes or olives, are harvested by means of mechanical harvesters that cut and harvest both the fruits and the foreign bodies attached to the fruits. The term "foreign bodies" indicates leaves, stems and/or stalks. After harvesting said fruits with harvesting machines, it is necessary to separate the fruits from the relevant foreign bodies.

Such an operation is necessary also when the fruits are harvested manually in order to separate the fruits from the foreign bodies attached to them.

Selection machines for separating the fruits from the relevant foreign bodies are known on the market, which comprise a cage formed of a tubular element provided with two open ends and one longitudinal axis. The cage is intended to receive the fruits and the relevant foreign bodies and comprises openings to let the foreign bodies pass.

The cage is connected to a fixed support frame by means of connection means. The connection means comprise a pin with a longitudinal axis parallel to the longitudinal axis of the cage.

The selection machines of the prior art comprise actuation means to actuate the cage around the pin along a transverse direction with respect to the longitudinal axis of the cage. The actuation means allow for separating the fruits from the relevant foreign bodies and ejecting the foreign bodies from the openings of the cage.

The cage moves along a trajectory substantially shaped as an arc of circumference that requires using complicated and articulated actuation means.

Another drawback in the use of such selection machines is represented by the fact that, during the movement of the cage along the aforesaid trajectory, the foreign bodies contained in the cage tend to come out from the openings of the cage in an uncontrolled way. Consequently, the machine is difficult to use because it is not possible to define a space wherein the foreign bodies will fall. Moreover, it is not easy to design and realize the successive process steps in order to collect the foreign bodies that have fallen off from the cage.

U.S. Pat. No. 1,924,111 discloses an apparatus for separating fruits from foreign bodies comprising a fixed support frame, a mobile frame connected to the fixed frame and actuation means to actuate the mobile frame.

The purpose of the present invention is to overcome the drawbacks of the prior art by providing a selection machine that is inexpensive and simple to maintain.

Another purpose is to provide a selection machine that is easy to make and use.

BRIEF SUMMARY OF THE INVENTION

The selection machine of the invention for separating fruits from foreign bodies comprises:
- a fixed support frame;
- a mobile frame that is connected to the fixed frame and comprises an inlet mouth, an outlet mouth and a longitudinal axis;
- connection means between the fixed frame and the mobile frame;
- actuation means of the mobile frame.

Said mobile frame has a rectangular section and comprises an upper wall, a lower wall and a pair of sides that connect the upper wall to the lower wall. Said mobile frame defines a space in which the fruits and the relevant foreign bodies are intended to be inserted through the inlet mouth. The upper wall and the lower wall of the mobile frame comprise a plurality of holes with dimensions suitable for allowing the passage of said fruits. Said mobile frame oscillates around a horizontal axis of rotation disposed transversally with respect to the longitudinal axis.

The connection means comprise a horizontal connecting pivoting pin disposed in the inlet mouth of the mobile frame; said pin connecting said oscillating mobile frame to the fixed support frame; said pin having a longitudinal axis that coincides with the axis of rotation of the mobile frame.

Because of the provision of a mobile frame having a rectangular section, the manufacturing costs are lower compared to the use of a cylindrical cage because the mobile frame is easier to make.

Moreover, with the same width of the machine, the provision of a mobile frame with rectangular section and the high-low oscillating movement allow to increment the productivity of the selection machine according to the present invention, thus increasing the amount of fruits that can be received in the space of the mobile frame.

Because of the rectangular section of the mobile frame and of the provision of holes on the upper wall and on the lower wall, it is however necessary for the mobile frame to move around a horizontal pin disposed transversally with respect to the longitudinal axis of the mobile frame in order to avoid pressing the fruits on the sides of the mobile frame.

BRIEF DESCRIPTION OF THE SEVERAL VIEWS OF THE DRAWINGS

For the sake of clarity, the description of the selection machine of the invention continues with reference to the attached drawings, which have a merely illustrative, not limiting value, wherein:

FIG. 1 is an axonometric view of the selection machine according to the present invention;

FIG. 2 is an axonometric view of the selection machine of FIG. 1 without an external frame;

DETAILED DESCRIPTION OF THE INVENTION

Figure 4:
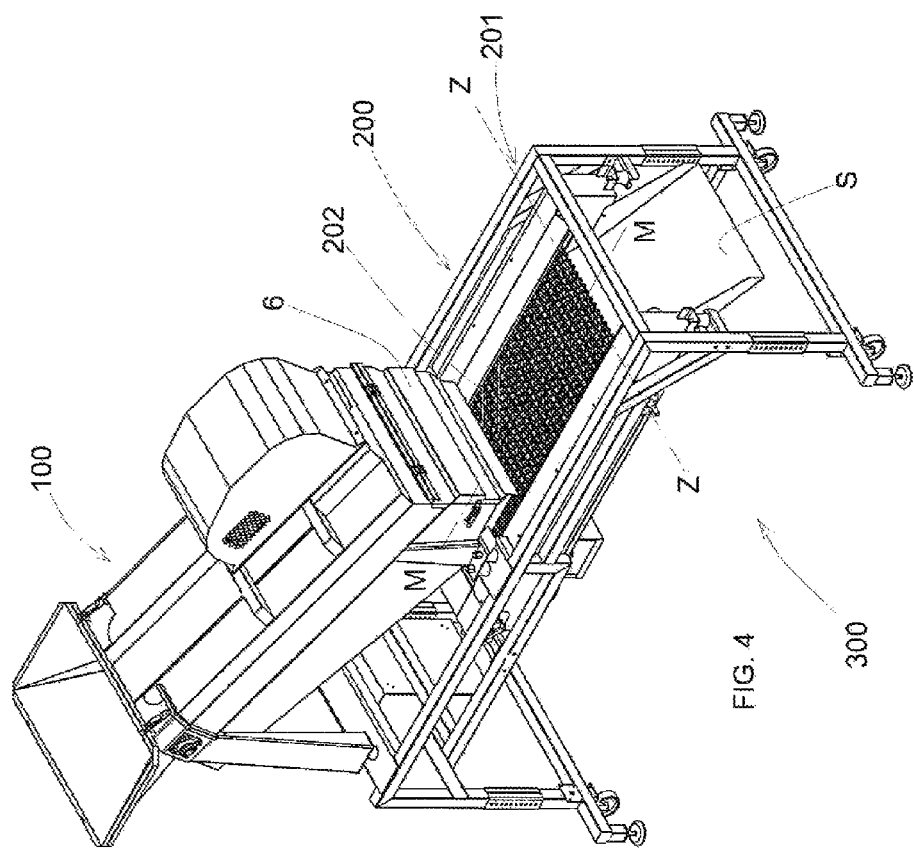
FIG. 4 is an axonometric view of a stalk-removing machine comprising the selection machine according to the invention and a selection table.

With reference to FIGS. 1 and 2, a selection machine according to the invention is disclosed, which is generally indicated with reference numeral (100).

With reference to FIG. 1, the selection machine (100) is intended to separate fruits from foreign bodies and comprises a fixed support frame (1) and a mobile frame (2) connected to said fixed support frame (1).

Figure 3:
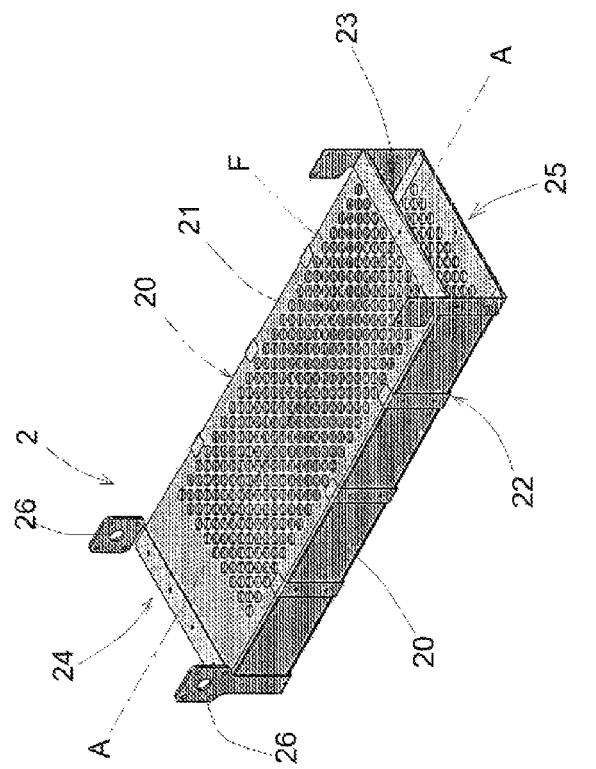
FIG. 3 is an axonometric view of a mobile frame of the selection machine according to the present invention.

With reference to FIGS. 2 and 3, the mobile frame (2) has a rectangular section and a longitudinal axis (A-A).

The mobile frame (2) comprises:
an upper wall (21);
a lower wall (22) parallel to the upper wall (21), and
a pair of sides (20) that connect the upper wall (21) to the lower wall (22).

The mobile frame (2) also comprises an inlet mouth (24) and an outlet mouth (25) disposed transversally with respect to the longitudinal axis (A-A).

The mobile frame (2) defines a space (23) in which the fruits and the relevant foreign bodies are intended to be inserted through the inlet mouth (24).

The upper wall (21) and the lower wall (22) comprise a plurality of holes (F) with dimensions suitable for allowing the passage of said fruits.

The mobile frame (2) oscillates around a horizontal axis of rotation (XX) disposed transversally with respect to the longitudinal axis (A-A).

The fixed support frame (1) comprises a hopper (13) immediately upstream the inlet mouth (24) of the mobile frame for introducing the fruits and the relevant foreign bodies inside the mobile frame (2).

The fixed support frame (1) comprises:
two back legs (11) with a height (H1) disposed in correspondence of and under the inlet mouth (24) of the mobile frame, and
two front legs (12) disposed in correspondence of and under the outlet mouth (25) of the mobile frame and having a height (H2) that is lower than the height (H1) of the back legs (11).

The mobile frame (2) is revolvingly connected to the fixed support frame (1) onto the back legs (11), substantially in correspondence of the inlet mouth (24) of the mobile frame (2). The selection machine (100) comprises connection means (5) between the fixed support frame (1) and the mobile frame (2). The connection means (5) comprise a horizontal connecting pivoting pin (P) to connect the oscillating mobile frame (2) to the fixed support frame (1). The mobile frame (2) comprises two lateral openings (26) in correspondence of the inlet mouth (24) of the mobile frame (2). The pin (P) is inserted in the lateral openings (26) of the mobile frame (2) and has a longitudinal axis that coincides with the horizontal axis of rotation (X-X) around which the mobile frame (2) rotates.

The selection machine (100) comprises actuation means (3) to actuate the mobile frame (2). The fixed support frame (1) comprises a support bracket (not shown in the attached figures) to house and support said actuation means (3).

Said actuation means (3) comprise:
a motor (30) comprising a shaft (31);
motion transmission and conversion means (32) connected to the shaft (31) of the motor, and
a rod (33) comprising a first end connected to the motion transmission and conversion means (32) and a second end connected to the mobile frame (2), in correspondence of the outlet mouth (25) of the mobile frame (2).

The actuation means (3) are configured in such manner that the mobile frame (2) oscillates at a frequency comprised between 90 and 500 oscillations per minute, in such a way to generate a force able to detach the fruit from the relevant foreign body.

The mobile frame (2) can be also actuated by a linear actuator. The linear actuator may comprise a cylinder-piston system of hydraulic, pneumatic or electrical type, or a screw-female screw system actuated by means of an electrical motor.

The selection machine (100) comprises an external frame (4) suitable for covering the mobile frame (2) in such manner to stop the fruits coming out from the holes (F) of the upper wall (21) and of the lower wall (22) of the mobile frame (2). The external frame (4) comprises:
an upper wall (41) disposed above the upper wall (21) of the mobile frame,
a lower wall (42) disposed under the lower wall (22) of the mobile frame, and
two lateral walls (40) engaged against the sides (20) of the mobile frame.

The upper wall (41) of the external frame, the upper wall (21) of the mobile frame and the lateral walls (40) of the external frame define an upper space (43) suitable for receiving the fruits and the foreign bodies coming out from the top of the space (23) of the mobile frame.

The lower wall (42) of the external frame, the lower wall (22) of the mobile frame and the lateral walls (40) of the external frame define a lower space (44) suitable for receiving the fruits and the foreign bodies coming out from the bottom of the space (23) of the mobile frame.

The upper space (43) and the lower space (44) comprise an outlet mouth (45) respectively disposed above and under the outlet mouth (25) of the mobile frame (2).

The upper wall (41) of the external frame (4) and the lower wall (42) of the external frame (4) have longitudinal axes (C-C, D-D) that form acute angles with a longitudinal axis (B-B) of each back and/or front leg of the fixed support frame, in such manner to allow the fruit to travel down towards the outlet mouths (45) of the upper space (43) and/or of the lower space (44).

The external frame (4) is joined to the fixed support frame (1), and consequently it is not actuated by the actuation means (3).

Because of the provision of the external frame (4), the fruits that come out from the mobile frame (2) are conveyed into the outlet mouth (25) of the mobile frame and in the outlet mouths (45) of the external frame, whereas the foreign bodies remain inside the space (23) of the mobile frame and come out from the outlet mouth (25) of the mobile frame.

Advantageously, as shown in FIG. 4, the selection machine (100) is part of a stalk-removing machine (300) for separating and selecting the fruits with respect to the relevant foreign bodies. The stalk-removing machine (300) also comprises a selection table (200) for separating the fruits from the foreign bodies. The selection table (200) comprises a frame (201) having a longitudinal axis (M-M) and at least one set of rollers (202) revolvingly mounted in the frame (201). Each roller (202) comprises a shaft with an axis of rotation (Z-Z) orthogonal with respect to the longitudinal axis (M-M) of the frame (201).

The selection table (200) comprises adjusting means intended to adjust the distance between the axes of rotation (Z-Z) of the rollers (202) according to the dimensions of the fruits to be cleaned.

The selection machine (100) is positioned on the selection table (200), in particular the outlet mouth (25) of the mobile frame (2) of the selection machine (100) is positioned on the selection table (200).

The selection machine (100) comprises a barrier (6) disposed in correspondence of the outlet mouth (25) of the mobile frame and of the outlet mouths (45) of the external frame to convey on the selection table (200) the fruits and the foreign bodies falling from the outlet mouth (25) of the mobile frame and from the outlet mouths (45) of the external frame.

The fruits and the relevant foreign bodies are introduced in the hopper (13) and fall in the inlet mouth (24) of the mobile frame. Because of gravity, the fruits and the relevant foreign bodies are moved towards the outlet mouth (25) of the mobile frame (2).

Meanwhile, the motor (30) of the actuation means (3) is in operation, therefore the shaft (31) of the motor (30) transmits the motion to the motion transmission and conversion means (32) to convert the rotatory motion into rectilinear motion and transmit the motion to the rod (33). The rod (33) moves the mobile frame (2) allowing the mobile frame (2) to rotate around the pin (P).

Consequently, the inlet mouth (24) of the mobile frame (2) is always hinged to the back legs (11) of the fixed support frame, whereas the outlet mouth (25) is cyclically raised and lowered with respect to the front legs (12) of the fixed support frame (1).

While passing from the inlet mouth (24) to the outlet mouth (25) of the mobile frame, the fruits and the relevant foreign bodies hit against the upper wall (21) and against the lower wall (22) of the mobile frame (2), being trapped into the holes (F) of the upper wall (21) and of the lower wall (22) of the mobile frame (2) and causing the separation of the fruits from the relevant foreign bodies.

It is possible that some of the fruits having a lower diameter than the holes (F) of the upper wall (21) and of the lower wall (22) come out from the holes (F) and hit against the upper wall (41) or the lower wall (42) of the external frame.

The fruits come out from the outlet mouth (25) of the mobile frame and from the outlet mouths (45) of the external frame, whereas the foreign bodies mainly come out from the outlet mouth (25) of the mobile frame. The fruits and the foreign bodies fall onto the selection table (200). Having lower dimensions than the foreign bodies, the fruits are inserted in the space between two consecutive rollers (202) and fall from the selection table (200), whereas the foreign bodies remain on the selection table (200) and are conveyed towards a slide (S) used to discharge waste.

We claim:

1. A selection machine for separating fruits from foreign bodies, the selection machine comprising:
   a rigid support frame;
   a mobile frame connected to said rigid support frame and comprising an inlet mouth, an outlet mouth and a longitudinal axis;
   a connector between said rigid support frame and said mobile frame;
   an actuator cooperative with said mobile frame, wherein said mobile frame has a rectangular section and comprises an upper wall, a lower wall and a pair of sides that connect said upper wall to said lower wall, said mobile frame defining a space in which the fruits and the foreign bodies are inserted through said inlet mouth, said upper wall and said lower wall comprising a plurality of holes with dimensions suitable for allowing a passage of the fruit, said mobile frame oscillating around a horizontal rotation axis disposed transverse to the longitudinal axis, wherein said connector comprises a horizontal connecting pivoting pin disposed in said inlet mouth of said mobile frame, said pivoting pin connecting said mobile frame to the said rigid support frame, said pivoting pin having a longitudinal axis that coincides with the horizontal rotation axis of said mobile frame; and
   an external frame adapted to cover said mobile frame in such manner to stop the fruits and the foreign bodies coming out of the plurality of holes of said upper wall and of said lower wall of said mobile frame, said external frame comprising two lateral walls, an upper wall and a lower wall, said upper wall of said external frame and said upper wall of said mobile frame and said two lateral walls of said external frame defining an upper space adapted to receive the fruits and the foreign bodies coming out from a top of the space of said mobile frame, said lower wall of said external frame and said lower wall of said mobile frame and said two lateral walls of said external frame defining a lower space adapted to receive the fruits and the foreign bodies coming out from a bottom of the space of said mobile frame.

2. The selection machine of claim 1, wherein said rigid fixed support frame comprises back legs and front legs, said upper wall of said external frame and said lower wall of said external frame having longitudinal axes that form acute angles with a longitudinal axis of each of said back legs or said front legs of said fixed support frame.

3. The selection machine of claim 1, wherein said external frame is joined to said rigid support frame.

4. The selection machine of claim 1, wherein said upper wall and said lower wall of said mobile frame are parallel.

5. The selection machine of claim 1, wherein said actuator comprises:
   a motor having a shaft; motion transmitter and converter connected to said shaft of said motor; and a rod connected to said motion transmitter and converter and to said mobile frame in an outlet mouth of said mobile frame.

6. The selection machine of claim 1, wherein said actuation is configured in such that said mobile frame oscillates at a frequency of between 90 and 500 oscillations per minute.

7. The selection machine of claim 1, wherein said rigid support frame comprises a hopper upstream of the inlet mouth of said mobile frame and adapted to introduce the fruits and the foreign bodies into said mobile frame.

8. A stalk-removing machine comprising the selection machine of claim 1, and a selection table for separating fruits from foreign bodies.

9. The stalk-removing machine of claim 8, wherein the outlet mouth of said mobile frame of the selection machine is positioned above said selection table.

* * * * *